Figure 1:
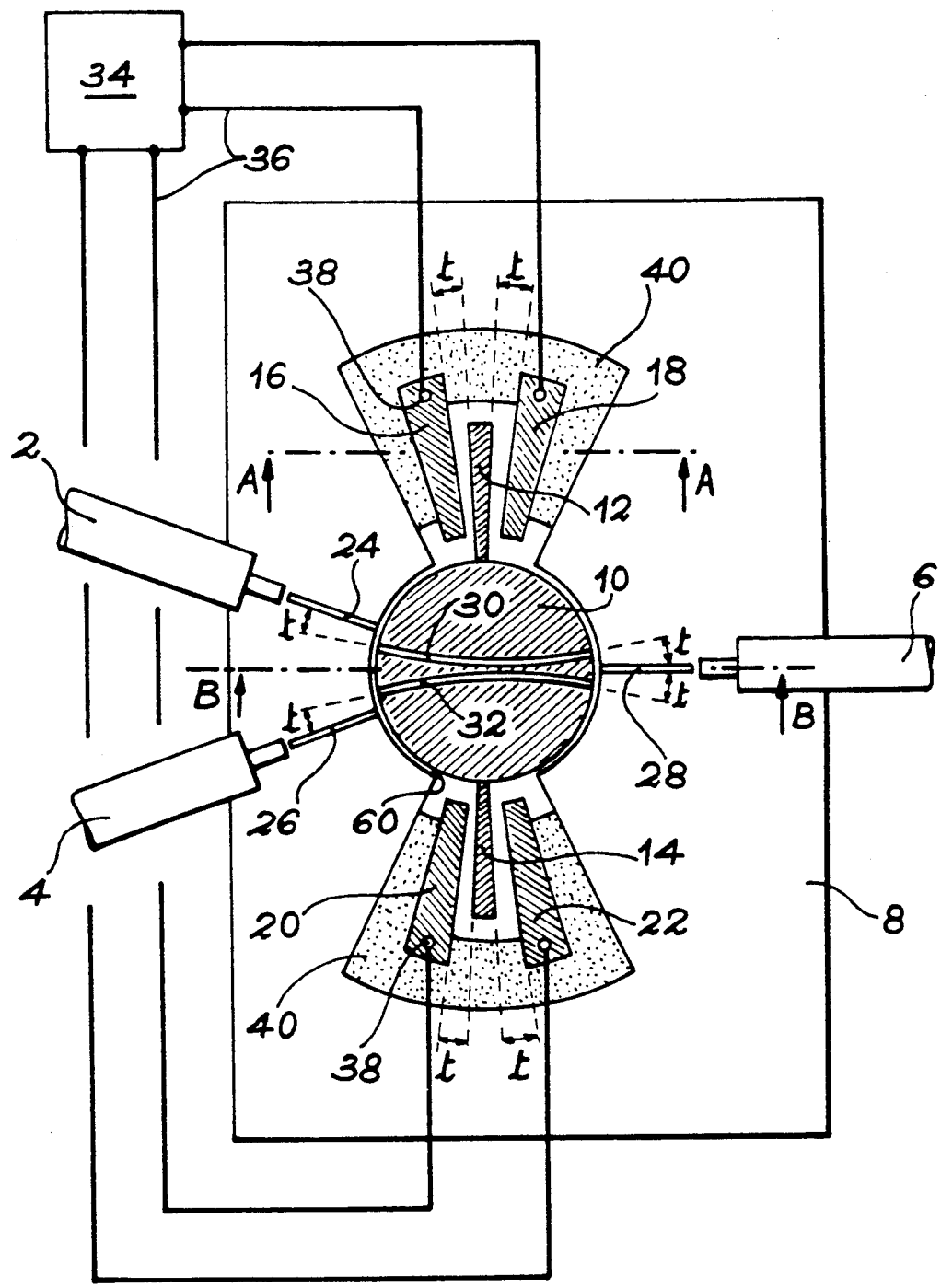

United States Patent
Delapierre

[11] Patent Number: 5,278,692
[45] Date of Patent: Jan. 11, 1994

[54] OPTICAL SWITCH AND PROCESS FOR THE PRODUCTION OF SAID SWITCH

[75] Inventor: Gilles Delapierre, Seyssins, France

[73] Assignee: Commissariat a L'Energie Atomique, France

[21] Appl. No.: 940,529

[22] Filed: Sep. 4, 1992

[30] Foreign Application Priority Data

Sep. 17, 1991 [FR] France ............... 91 11420

[51] Int. Cl.[5] ........................... G02B 26/02
[52] U.S. Cl. .................... 359/236; 385/16
[58] Field of Search ........... 359/227, 230, 236; 385/16, 17, 19-

[56] References Cited

U.S. PATENT DOCUMENTS 4,401,365 8/1983 Mizokawa et al. ............ 385/20

FOREIGN PATENT DOCUMENTS 2939539 5/1981 Fed. Rep. of Germany .
702518 4/1987 United Kingdom .

OTHER PUBLICATIONS

IBM Technical Disclosure Bulletin, vol. 29, No. 6, Nov., 1986 pp. 2799-2800.
IBM Technical Disclosure Bulletin, vol. 32, No. 10B, Mar., 1990 pp. 172-174.

Primary Examiner—Bruce Y. Arnold
Assistant Examiner—James Phan
Attorney, Agent, or Firm—Pearne, Gordon, McCoy & Granger

[57] ABSTRACT

The switch is formed on a support (8) and has light guides (24, 26, 28), a rotary part (10) carrying the intermediate light guides (30, 32) and which is able to occupy, by rotations, positions in each of which an intermediate guide connects two guides to one another, and rotary means (12 to 22) for the rotary part. The switch is formed from two semiconductor substrates, in which are defined two parts which, after superimposing and fixing the substrates to one another, form the rotary part which is then released from the remainder of the substrates.

7 Claims, 5 Drawing Sheets

OPTICAL SWITCH AND PROCESS FOR THE PRODUCTION OF SAID SWITCH

DESCRIPTION

The present invention relates to an optical switch and to a process for the production of said switch. It also applies to the field of optical telecommunications.

Optical fibres making it possible to transport a large number of informations in a disturbed electromagnetic medium have made a significant contribution to the development of this field. However, this development has been held by the difficulty of producing high performance optical switches.

The function of an optical switch is to permit the connection between a random optical fibre taken from N optical fibres and a random optical fibre taken from among M optical fibres, N being an integer at least equal to 2 and M an integer equal to 1.

The N optical fibres are e.g. emitting fibres, the M optical fibres then being receiving fibres or conversely the N fibres are receiving and the M fibres transmitting.

Optical switching, which does not have to be very fast, can be carried out with the aid of mechanical systems. The mechanical systems known in this field of optical switching suffer from the disadvantage of being heavy, cumbersome and costly, whilst the positioning tolerances between the fibres are very limited.

To obviate this disadvantage, optical switching systems have been produced by microlithography methods and thin films in the same way as in the microelectronics field.

The thus produced known systems all use for their operation the bending of optical fibres or parts supporting said fibres, with a view to aligning one fibre with another.

These known systems using microlithography methods and thin films suffer from the disadvantages of being sensitive to accelerations and not making it possible to ensure maintenance of a position in which one fibre is aligned with another in the absence of a power supply. Moreover, the bending of the optical fibres can induce disturbances.

The sensitivity to accelerations can certainly be reduced by stiffening the flexible structures, but this leads to an increase in the power of the "motors", which bend the fibres and therefore increase the control voltages or currents and the size of said motors. Unfortunately, this increase in the size of the motors again increases the sensitivity to accelerations.

The present invention aims at obviating the above disadvantages. To this end, in the invention use is made of intermediate light guides, so that there is no need to displace the transmitting optical fibres and receiving optical fibres, said intermediate light guides are placed on a rotary part or rotor, whose center of gravity is located on the rotation axis of said rotary part, which eliminates the sensitivity to accelerations, the fact of using such a rotary part (which is disengaged from the remainder of the switch) giving a stable position system in the absence of an electric power supply and use is made of a "vernier" system, so as to be able to switch one optical fibre taken from among N optical fibres towards a single optical fibre with a single rotary movement.

Moreover, in the present invention, use if made of an integrated production technology making it possible to obtain a good compatibility between the light guides, the rotary part and the rotation means of the latter.

Moreover, an integrated production technology makes it possible to produce a large number of elementary optical switches on the same semiconductor substrate.

More specifically, the present invention firstly relates to an optical switch having at least one elementary optical switch formed on a support, said elementary optical switch comprising a first array of N input-output light guides, N being an integer at least equal to 2, a second array of M input-output light guides, M being an integer at least equal to 1, a rotary part rotatable with respect to the support and which carries intermediate light guides, the center of gravity of the rotary part provided with the intermediate light guides being on the rotation axis of said rotary part, which is able to occupy, by rotation, positions in each of which one of the intermediate light guides connects one of the N input-output light guides to one of the M input-output light guides and means for rotating the rotary part, able to make the matter occupy any random one of the positions, characterized in that the support comprises a first substrate and a second substrate in planar form, which are superimposed and which are fixed to one another, the first substrate comprising at least one rotary portion, the second substrate comprising at least one rotary portion, said two rotary portions being superimposed and fixed to one another so as to form the rotary part and one of the two substrates and the corresponding rotary portion respectively carry the input-output light guides and the intermediate light guides.

According to a special embodiment of the switch according to the invention, the number N is equal to 2, the number M is equal to 1, the number of intermediate light guides is equal to 2, so that the number of positions is equal to 2 and the rotating means of the rotary part comprise a first group of two fixed, spaced electrodes, a second group of two fixed, spaced electrodes and which are respectively opposite to the two electrodes of the first group with respect to the rotary part, two mobile electrodes rigidly integral with the rotary part and electrically interconnected and respectively placed between the two electrodes of the first group and between the two electrodes of the second group, so that they apply a voltage between two opposite electrodes respectively belonging to the first and second groups and it is possible to pas the rotary part from a position in which the mobile electrodes are in contact with two other opposite electrodes to the other position.

According to another special embodiment, the number N exceeds 2, the number M is equal to 1, the number of intermediate light guides is equal to N, so that the number of positions is equal to N, the rotary part comprising on its periphery N slots and rotation means comprising teeth respectively associated with the slots and able to engage therein and actuating means respectively associated with the teeth, each actuating means engaging the corresponding tooth in the corresponding slot, thus bringing the rotary part to one of its positions and for disengaging said tooth from said slot.

In a special construction corresponding to said embodiment, each actuating means comprises a lever at one end of which is fitted the corresponding tooth and an elongated, deformable electrode fixed at its two ends and able to move, accompanied by deformation, the other end of the lever, thus causing the engagement of the corresponding tooth in the corresponding slot and the rotation means also means for creating a magnetic field perpendicular to the elongated electrodes, so that by applying a voltage between the ends of one of the elongated electrodes, the latter undergoes a deformation.

The present invention also relates to a process for the production of the optical switch according to the invention.

This process is characterized in that it comprises the following stages: production of N input-output light guides, M input-output light guides and intermediate light guides on one of the faces of a first semiconductor substrate, said face being called the front face of the first substrate, formation of a recess in said first substrate from the other face thereof and called the rear face of the first substrate, said recess defining a first portion of the rotary part, the intermediate light guides being located on said first portion, formation of a toroidal recess in a second semiconductor substrate from one face thereof called the rear face of the second substrate, said toroidal recess defining a second portion of the rotary part, fixing the other face of the second substrate, called the front face of the second substrate, to the rear face of the first substrate, so as to fix the first portion of the rotary part to its second portion and release of the rotary part from the remainder of the first and second substrates.

According to a special embodiment of the process according to the invention, the substrates are made from silicon and are fixed to one another by means of silicon-fusible glass.

Finally, in a special realization of said process, the substrates are of silicon, in the second substrate is formed from the upper face thereof a buried silicon dioxide layer in the form of a ring, whose axis corresponds to the rotation axis of the rotary part, circular etching takes place around said axis from the upper face of the second substrate and up to said buried layer and, after fixing the substrates to one another, said buried layer is eliminated across the toroidal recess, the latter being formed in the second substrate up to said buried layer, which frees the corresponding portion of the rotary part.

The invention is described in greater detail hereinafter relative to non-limitative embodiments and with reference to the attached drawings, wherein show:

FIG. 1 A partial, diagrammatic view of an optical switch according to the invention.

Figure 2:
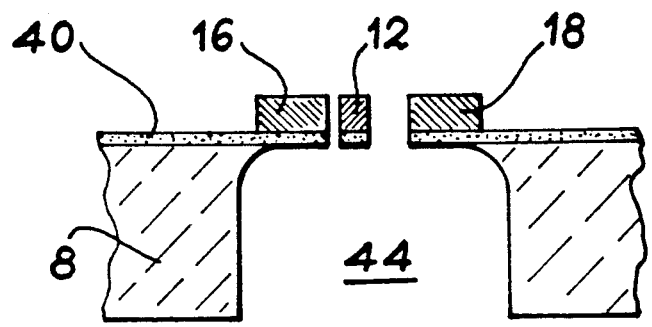

FIG. 2 The section A—A of FIG. 1.

Figure 3:
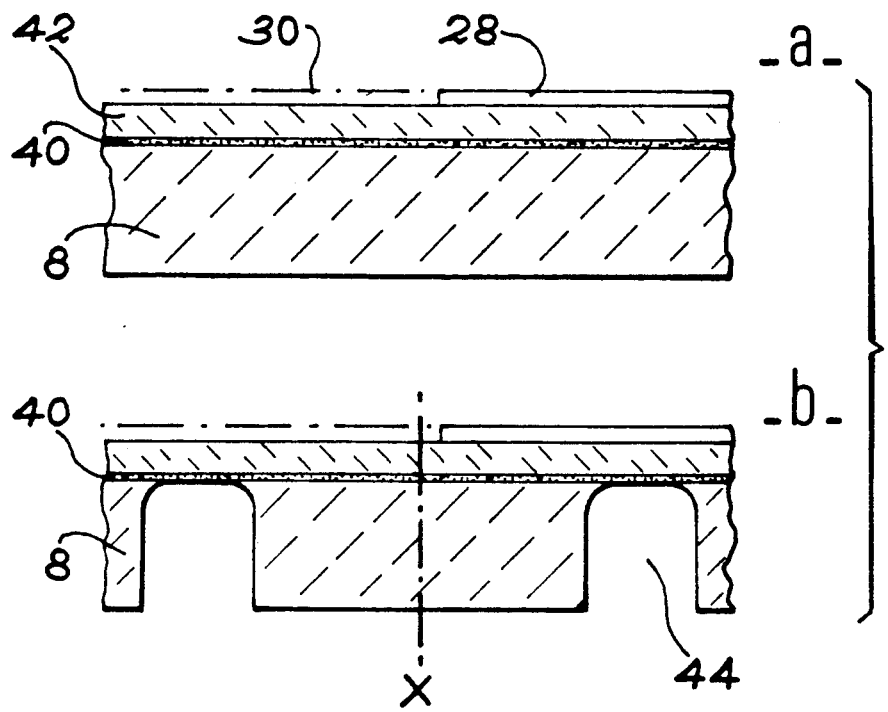
Figure 4:
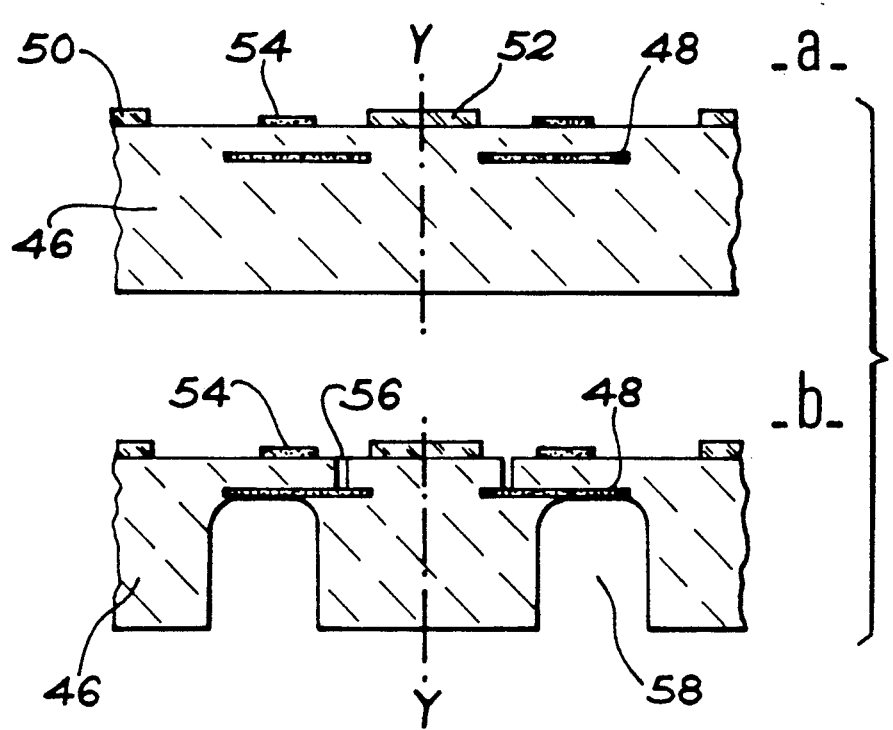
Figure 5:
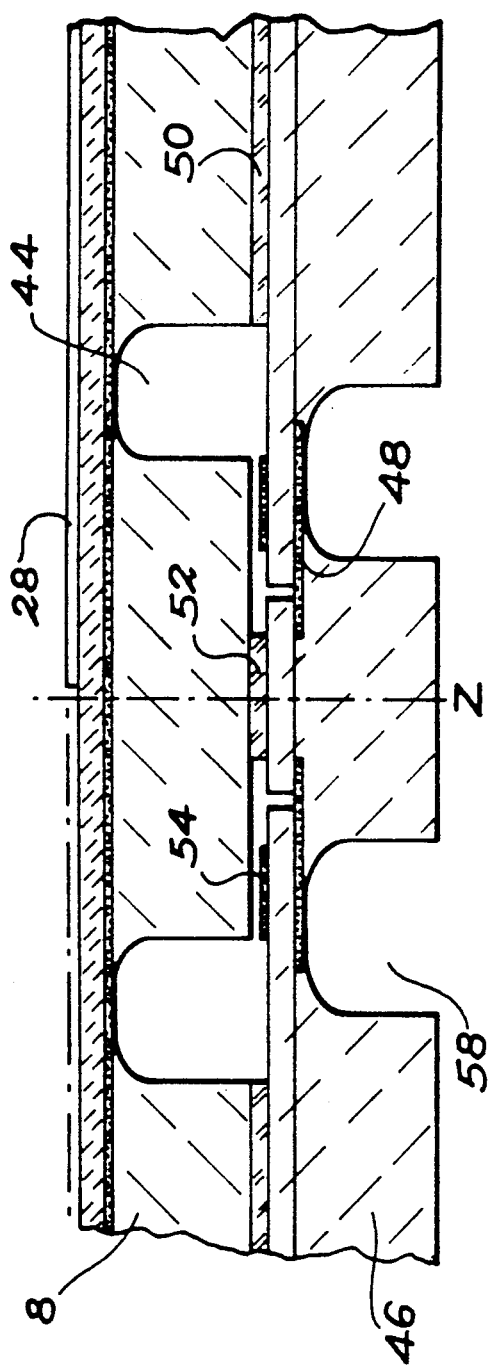
Figure 5:
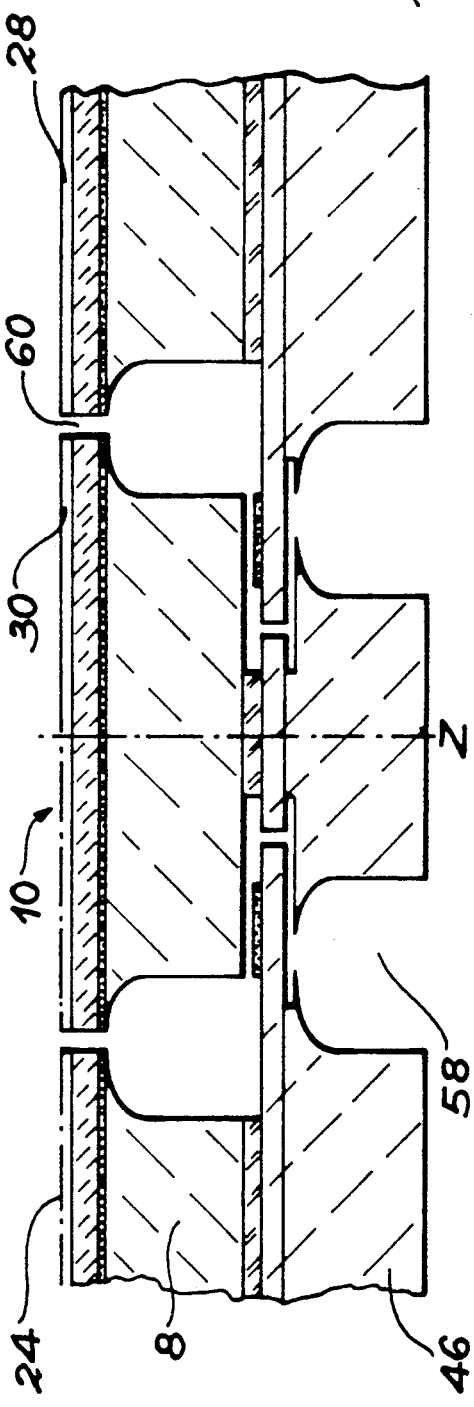

FIGS. 3a-5b Diagrammatically illustrates different stages of a process for producing an optical switch as shown in FIG. 1, the part b of FIG. 5 being the section B—B of FIG. 1.

Figure 6:
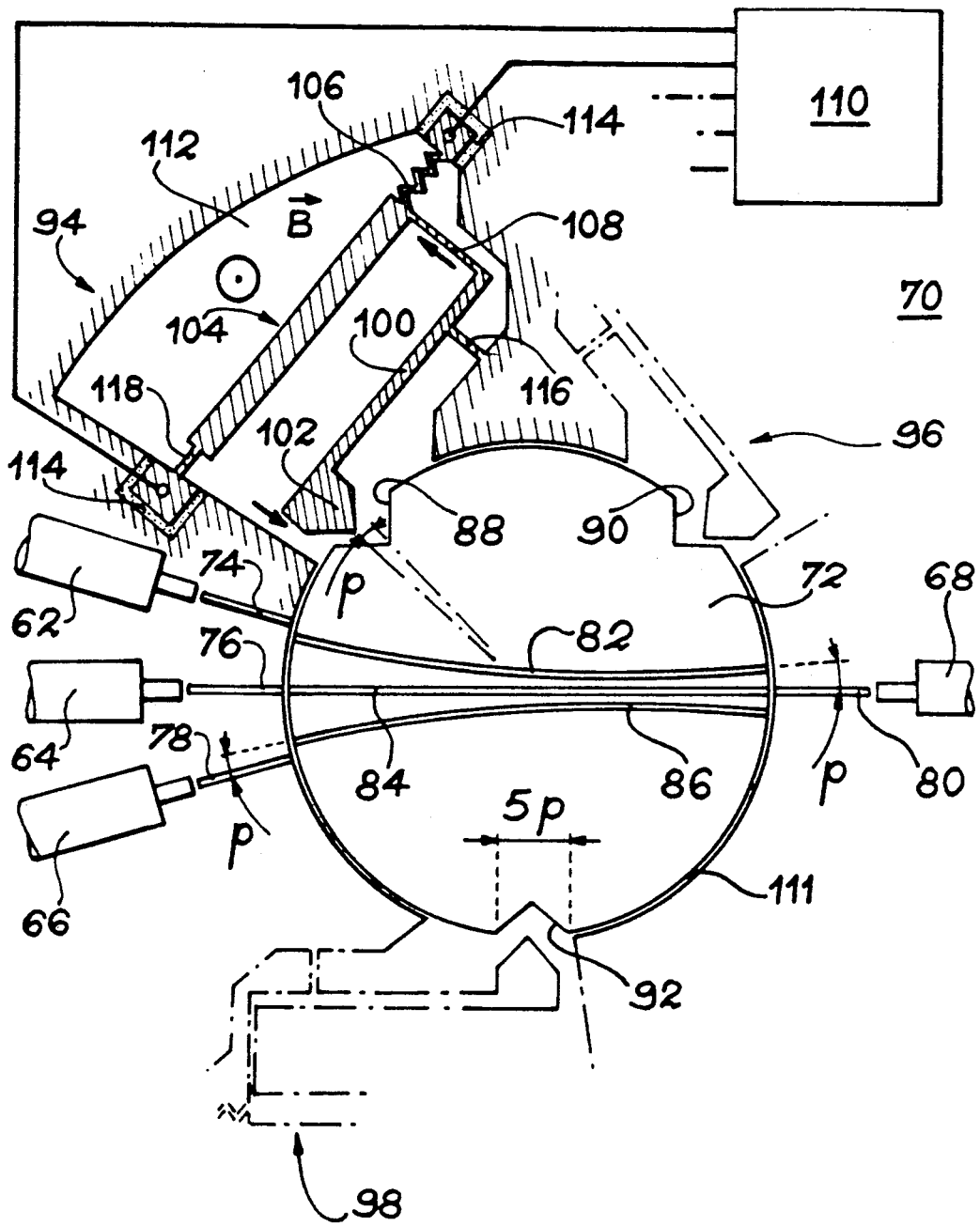

FIG. 6 A diagrammatic, partial view of another optical switch according to the invention.

Figure 7:
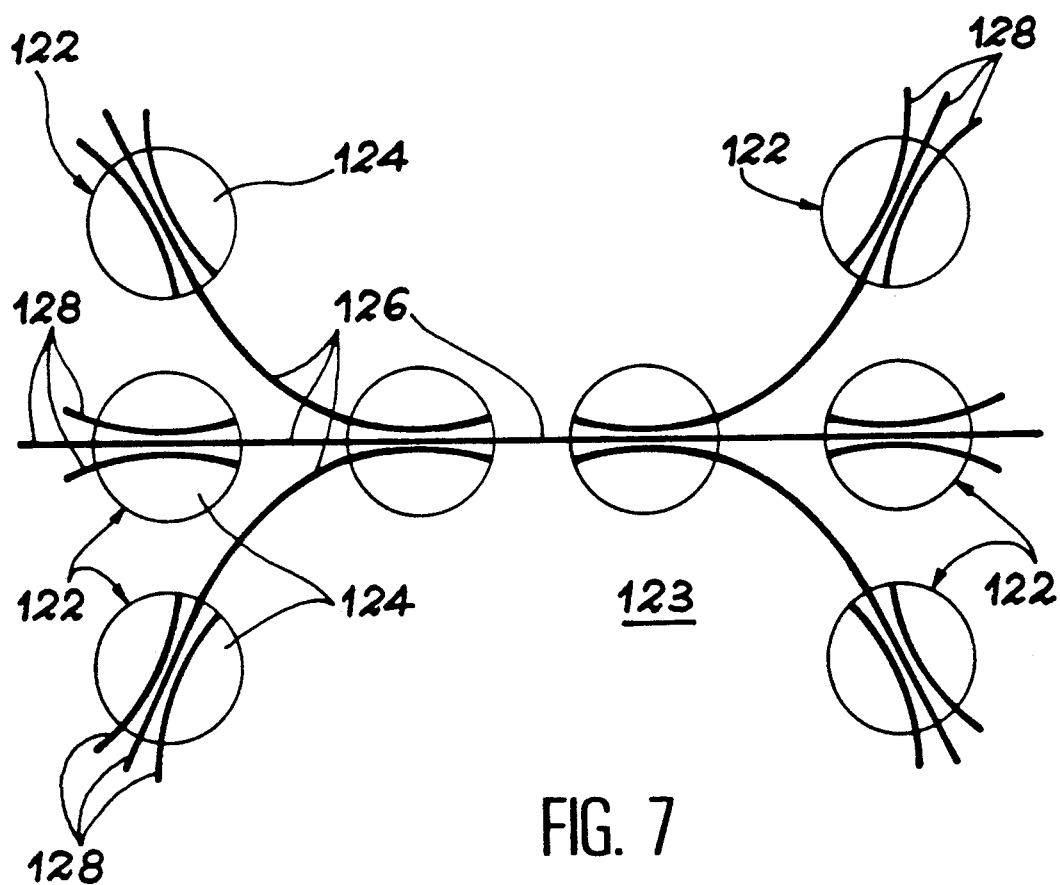

FIG. 7 A diagrammatic, partial plan view of an optical switch according to the invention having a plurality of elementary optical switches also according to the invention.

FIG. 1 diagrammatically and partly shows in plan view an optical switch according to the invention. It is a switch of the "2 to 1" type making it possible to optically connect any random one of the two optical fibres 2 and 4 to another optical fibre 6, in order to pass light from one of the fibres 2 and 4 into the fibre 6 or vice versa.

The optical switch according to the invention shown in FIG. 1 is produced from two semiconductor substrates, which are e.g. made from silicon, as will be explained hereinafter. FIG. 1 shows one of these two substrates, which constitutes the upper substrate and carries the reference 8. It is also possible to see the upper portion of a rotary part 10 of said switch and which is also produced from two substrates.

Said rotary part 10 is electrically insulated from the remainder of the switch and has two diametrically opposite extensions 12 and 14 (the rotary part 10 has a symmetry of revolution about its rotation axis) and which are electrically connected to one another by means of the rotary part 10.

Thus, the semiconductor material used for producing the switch shown in FIG. 1 has an adequate conductivity for the operation of the switch, which is explained hereinafter and consequently there is an electrical continuity from the extension 12 to the extension 14 passing through the rotary part 10.

In the switch shown in FIG. 1, the extensions 12 and 14 form mobile electrodes.

The switch shown in FIG. 1 also comprises two fixed, spaced electrodes 16, 18 produced from the semiconductor substrate 8.

The switch of FIG. 2 also has two other electrodes 20, 22, which are fixed to one another and spaced and produced from the semiconductor substrate 8.

In the embodiment shown in FIG. 1, the electrode 22 is symmetrical to the electrode 16 with respect to the rotation axis of the rotary part 10 and the electrode 20 is symmetrical of the electrode 8 with respect to said rotation axis. The mobile electrode 12 is located between the electrodes 16 and 18 and the electrode 14 is located between the electrodes 20 and 22.

As can be seen in FIG. 1, the upper face of the substrate 8 carries three light guides 24, 26 and 28 respectively associated with the optical fibres 2, 4 and 6. Moreover, the upper face of the rotary part 10 also carries two intermediate light guides 30, 32. The guides 24 and 26 are located on one side of the rotary part and the guide 28 on the other side of said rotary part 10.

These guides 24, 26 and 28 are rectilinear and each of them stops, on one side, level with the circular space separating the upper portion of the rotary part 10 from the substrate 8, whilst on the other side each of the guides 24, 26, 28 is optically connected to the corresponding optical fibre.

The guides 24, 26 and 28 are located on lines meeting the rotation axis of the rotary part 10. The guides 30 and 32 are curved and symmetrical to one another relative to a plane containing said rotation axis. Moreover, the ends of the intermediate guides 30 and 32 are level with the circular space referred to hereinbefore.

The curvature of the intermediate guides 30, 32 is determined in such a way that, by rotating the rotary part 10, the switch of FIG. 1 can be in one of the two following states: a state in which the intermediate guide 30 is optically connected, on one side, to the guide 24 and on the other side to the guide 26, so that there is an optical link between the fibres 2 and 6 (the intermediate guide 32 not then being connected to any fibre) and a state in which the intermediate guide 32 is optically connected, on one side, to the optical fibre 4 and on the other to the optical fibre 6, so that there is an optical link between these fibres 4 and 6, the intermediate guide 30 not then being connected to any optical fibre.

In FIG. 1, the rotary part 10 is shown in a position where no optical link is established and the mobile electrode 12 is equidistant of the fixed electrodes 16, 18, whilst the mobile electrode 14 is equidistant of the fixed electrodes 20, 22.

With the position of the rotary part 10 shown in FIG. 1, it can be seen that each of the mobile electrodes forms the same angle with the two fixed electrodes between which it is located and the angles formed by the ends of the intermediate guides with the corresponding fixed guides (formed on the substrate 8) are equal, all the angles being equal to the same value designated t in FIG. 1.

FIG. 1 also shows the means 34 for applying a voltage either between the electrodes 16 and 22 or between the electrodes 18 and 20, by means of electric wires 36 from the means 34 and which lead to electrical connection elements 38 formed on the electrodes 16, 18, 20 and 22.

One of the two aforementioned states is selected by means of an electrostatic force, which is produced when the voltage is applied.

For example, starting from the position in which the electrodes 12 and 14 are respectively in contact with the electrodes 16 and 22, the application of the voltage between the electrodes 18 and 20 brings about the rotation of the rotary part 10 and the electrodes 12 and 14 come into contact with the electrodes 18 and 20, which leads to the establishment of an optical link between the fibres 2 and 6.

To return to the preceding position, the voltage is applied between the electrodes 16 and 22.

The electrostatic force is proportional to the quotient, based on the rotation angle of the rotary part 10, of the following quantity:

$$(\tfrac{1}{2}) \cdot C \cdot V^2$$

in which C represents the capacity constituted by the fixed and mobile electrodes and V the voltage applied between the fixed electrodes.

This electrostatic force does not have to be too high, because it only has to overcome the frictional forces which can be made low. Moreover, for switching purposes, it is possible to use a high voltage pulse, because said voltage does not have to be maintained once switching has been carried out.

However, when said switching is carried out, it is optionally possible for security reasons to guarantee the maintaining of the new state of the switch by maintaining between the two fixed electrodes a low voltage because, in the embodiment of FIG. 1, the capacity C is very high, in view of the limited spacing between adjacent fixed electrodes.

Description will now be given of a process for the production of the optical switch shown in plan view in FIG. 1, on which it is only possible to see one of the two substrates used for the production of said switch. The other or lower substrates is visible in the section B—B of FIG. 1, constituting part b of FIG. 5.

This process, which uses an integrated technology, is advantageous in that it makes it possible to obtain, for the light guides, a very thick support with a thickness equal to that of the substrate 8. This is important for the process in question, in which the light guides are produced by deposition and etching of layers which can be of glass, doped glass, silicon dioxide or silicon nitride and which have a significant thickness of several micrometers.

These very thick layers are stressed and it is important that they have a rigid support. This support is the substrate 8 which, in the embodiment described, in made from silicon and has a thickness of approximately 0.4 mm.

On the basis of said substrate 8 is produced that portion of the rotary part or rotor which carries the intermediate light guides, whereas the rotor bearing is produced in the other substrate.

In the embodiment described, said other substrate is also made from silicon and has a thickness of approximately 0.4 mm.

An explanation will now be given of the process for the production of the switch shown in FIG. 1. The first stage is the treatment of the silicon substrate 8. In the latter is formed a silica coating 40 with a thickness of approximately 300 to 400 nm and which is buried to a depth of approximately 30 micrometers from the upper face of the substrate.

In order to do this, a deep oxygen implantation takes place by the known SIMOX process, followed by the burying of the coating obtained 40 using silicon epitaxy until the desired depth is obtained of 30 micrometers in the present example. This is illustrated by portion a of FIG. 3, where it is possible to see the epitaxially deposited silicon coating 42.

Then, formation takes place of the light guides 24, 26, 28, 30 and 32 by deposition and etching using a method known in the field of integrated optics on silicon.

Preferably, these light guides have a height of approximately 5 micrometers and a width of 10 micrometers so as to make the mechanical clearances acceptable.

Finally, formation takes place of the recess 44 visible in FIGS. 1 and 2 and in portion b of FIG. 3. This recess 44 is substantially toroidal and its axis carries the reference X and is provided with two extensions symmetrical to one another with respect to said axis. These extensions extends below the mobile electrodes 12 and 14 (cf. FIGS. 1 and 2). This recess 44 is produced by etching of the silicon up to the silica coating 40.

For this purpose use is made of a slightly anisotropic reactive ionic etching which, for speed reasons, is preferably of the superhigh frequency-assisted reactive ionic etching type.

The other silicon substrate 46 is then treated (FIG. 4). In said substrate 46 is firstly formed a silica coating 48 which has a thickness of approximately 300 to 400 nm and which is buried to a depth of approximately 10 micrometers from the upper face of the substrate 46. To do this, use is once again made of a deep oxygen implantation in the substrate 46 (SIMOX process), followed by silicon epitaxy until the desired silicon depth is obtained.

However, this oxygen implantation is localized in such a way that the coating 48 is shaped like a ring, whose axis carries the reference Y (cf. portion a of FIG. 4). During said localized implantation, the remainder of the upper substrate face is masked.

This is followed by deposition on the entire upper face of the thus epitaxied substrate 46 of a glass coating 40, which can be silicon fused and whose thickness is approximately 0.5 micrometer. Use is e.g. made of glass marketed by Corning under the reference Corning 7740.

This glass coating 50 is then etched so as to eliminate therefrom a ring-shaped portion, whose axis is the axis Y, which leaves behind a glass disk 52, whose axis is the axis Y, as is visible in portion a of FIG. 4.

This is followed by the deposition on the entire upper face of the substrate 46 coated with the thus etched glass coating of a silicon nitride coating, whose thickness is slightly less than that of the glass coating.

This silicon nitride coating is then etched in such a way that all that is left is a ring-shaped silicon nitride coating 54, which surrounds the disk-shaped coating 52 and whose axis is once again the axis Y. The function of the coating 54 is to reduce friction and control the mechanical clearances when the switched is manufactured.

From the upper face of the substrate 46 and down to the silica coating 48 is then formed a circular trench 56, whose axis is the axis Y and which is located between the disk 52 and the ring-shaped coating 54 (cf. portion b in FIG. 4). This circular trench 56 forms the bearing gap of the rotary part 10. The circular trench 56, which has a width of approximately 1 to 2 micrometers, is formed by anisotropic reactive ionic etching.

From the lower face of the substrate 46 and down to the ring-shaped silica coating 48 is then formed a substantially toroidal recess 58, whose axis is once again the axis Y. This recess 58 is formed by etching using the same method which led to the recess 44.

The rear face of the substrate 8 is then sealed to the front face of the substrate 46 by means of a glass coating 50 and the glass disk 52, so that the axes X and Y coincide and then constitute the rotation axis Z of the rotary part 10 (portion a of FIG. 5).

The sealing of the substrate 8 to the substrate 46 takes place by anodic bonding.

The ring-shaped silica coating 56 is then eliminated through the recess 58 by wet isotropic etching (cf. portion b of FIG. 5).

Then, the air gap 60 of the rotary part 10 is formed, said gap having a width of 5 micrometers and use is made of anistropic ionic etching. At the same time using such an etching process, formation takes place of the electrodes 12, 14, 16, 18, 20 and 22 visible in FIGS. 1 and 2.

The cores of the optical fibres 2, 4 and 6 are respectively connected to the ends of the light guides 24, 26 and 28. This is followed by the formation of the different electrical connections (elements 38).

Other embodiments of the optical switch according to the invention are clearly possible.

Another embodiment is diagrammatically and partly shown in FIG. 6.

It is pointed out that in the case where the number N exceeds 2, it is no longer possible to use the simple system shown in FIG. 1 with motor electrodes perpendicular to the substrate. In this case consideration could be given to the production of a stepping motor with a succession of circular arc electrodes around the rotary part or parallel to the substrate.

This solution, which permits an advance of one step p for each control pulse suffers from the disadvantage of not giving information on the absolute position of the rotary part.

The special embodiment diagrammatically and partly shown in FIG. 6 makes it possible to unambiguously select one from among three optical fibres.

More specifically, the optical switch according to the invention and which is diagrammatically and partly shown in FIG. 6, serves to connect any random one of the three optical fibres 62, 64 and 66 to another optical fibre 68. The switch of FIG. 6 is produced by a process similar to that permitting the production of the switch of FIG. 1.

The switch of FIG. 6 is once again produced from two semiconductor substrates, e.g. of silicon, only the upper substrate 70 being visible in FIG. 6. The switch shown in FIG. 6 also comprises a rotary part 72 produced from these substrates.

In FIG. 6, three light guides 74, 76, 78 (instead of two in FIG. 1) are formed on the upper substrate 70 on one side of the rotary part 72. These light guides 74, 76 and 78 are respectively connected to the optical fibres 62, 64, 66. On the other side of the part 72 there is once again a light guide 80, which is optically connected to the optical fibre 68.

The upper face of the part 72 carries three intermediate light guides 82, 84, 86, which are respectively associated with the optical fibres 62, 64, 66. These intermediate guides 82, 84, 86 are formed so as to permit, by an appropriate rotation of the rotary part 72, the establishment of an optical link between the guide 80 and any random one of the guides 74, 76 and 78.

As can be seen in FIG. 6, the rotary part 72 has on its periphery three slots 88, 90, 92 at 120° from one another.

The switch of FIG. 6 also has three actuating means 94, 96, 98, which are identical to one another and respectively associated with the slots 88, 90, 92, said actuating means being produced from the substrate 70.

Each of these actuating means comprises a lever 100, at one end of which is fitted a tooth 102, which engages in the corresponding slot, as well as an elongated, deformable electrode 104, whereof the two ends are integrated with the upper substrate 70, but are electrically insulated from the remainder of the latter. FIG. 6 shows that the electrode 104 can have on one side a zig-zag-shaped portion 106 for flexibility reasons.

The electrode 104, which is connected by a strip or bar 108 tot he lever 100 serves to displace, during deformation, the other end of the lever 100, thus bringing about the engagement of the tooth 102 in the corresponding slot.

The switch of FIG. 6 also has a magnetic means, e.g. a permanent magnet, for creating a magnetic field perpendicular to the upper substrate 70, said magnet being symbolized in FIG. 6 by the magnetic field B which it produces.

The two ends of each of the elongated electrodes 104 are electrically connected to means 110 for applying a voltage pulse between the two ends of any random one of the elongated electrodes 104. A current pulse then propagates in the selected elongated electrode 104. There is then a bending of the latter, which pushes the tooth 102 associated with said electrode into the corresponding slot. This brings about the rotation of the rotary part 72 by a fraction of a turn.

For example, starting from the position shown in FIG. 6, for which it was necessary to supply a voltage pulse to the actuating means 98, a voltage pulse is applied between the two ends of the elongated electrode of the actuating means 94. The corresponding tooth then pushes the corresponding slot and then reassumes its position and the part 72 turns to establish an optical link between the fibres 66 and 68.

The actuating means can be designed in such a way that, in the inoperative position, each tooth 102 is engaged in the corresponding slot, so that the teeth 102 still remain in front of the slots. This result can also be obtained by providing two abutments on either side of each slot.

The fact that it is only necessary to have a single electric pulse for bringing about switching makes it possible to use a high current (at least 100 mA) and therefore obtain an adequate displacement of the teeth 102 in the direction of the center of the part 72 with a magnetic field of approximately 0.5 T.

This displacement can be approximately 60 micrometers for a rotational displacement p of the rotary part 72 of approximately 30 micrometers, said displacement p being counted from the periphery of the rotary part 72.

It is necessary for the slots 88, 90 and 92 to be sufficiently wide to ensure that the corresponding teeth constantly face said slots, no matter what the switching position. To this end, each slot can have, on the periphery of the rotary part 72, a width approximately five times the displacement p.

The process for the production of the switch shown in FIG. 6, which is close to that described relative to FIGS. 1 to 5, firstly comprises the stages of treating the upper substrate 70, the formation of a buried silica coating, the formation of the different light guides and the formation of an appropriate recess from the lower face of the substrate 70. This recess has a substantially toroidal portion and three other portions arranged at 120° from one another and which are connected to the toroidal portion.

This toroidal portion is located below the circular gap 111 visible in FIG. 6 and which separates the rotary part 72 from the remainder of the substrate 70. The three other portions are located below the actuating means 94, 96, 98 and carry the reference 112 in FIG. 6.

After treating the upper substrate 70, the other substrate is treated involving the formation of a buried, ring-shaped silica coating, the formation of a glass coating for fixing the substrate 70 to said other substrate, the formation of a ring-shaped silicon nitride coating, the formation of a circular trench from the upper face of the other substrate and the formation of a toroidal recess from the lower face of said other substrate.

Said other substrate is then fixed to the upper substrate 70. The ring-shaped, buried silica coating is eliminated. The gap 111 is formed and at the same time the slots 88, 90, 92 and the actuating means incorporating the levers 100, the teeth 102, the elongated electrodes 104, the portions 106, the strips 108 and the elements 116, 118 referred to herinafter. The optical fibres are connected to the corresponding light guides and the various electrical connections are formed.

During the etching of the actuating means, for each of the latter, two portions 114 of the silica coating buried in the upper substrate 70 are made to appear. These two portions 114 are visible in the plan view of FIG. 6 and the two ends of the corresponding elongated electrode 104 rest on said two portions 114 and are therefore electrically insulated from the remainder of the substrate 70.

In the embodiment shown in FIG. 6 and for each of the actuating means, the width of each of the elements carrying the references 106, 108, 116 and 118 in FIG. 7 is less than 5 micrometers, so as to obtain a good bending flexibility.

The element 106 is the zig-zag-shaped portion by which one side of the elongated electrode 104 is mechanically connected to the substrate 70. The element 118 is a rectilinear, silicon portion by which the other side of said elongated electrode is mechanically connected to the substrate 70, as shown in FIG. 6. The element 108 is the strip connecting said elongated electrode to the lever 100. The element 116 is a silicon strip extending from the lever 100 to the substrate 70 and around which the lever 100 pivots.

On the basis of a switch of the type shown in FIG. 6 and which is a switch of the "3 to 1" type, it is possible to construct optical switches of the "N to M" type. This is illustrated in FIG. 7, which shows in plan view an optical switch of the "9 to 9" type.

The switch shown in FIG. 7 is a series, parallel connection of elementary optical switches 122 produced from the same substrates and of the type shown in FIG. 6. Only one of these substrates is visible in FIG. 7 and carries the reference 123.

The rotary parts 124 of the switches 122 are identical to one another and each of the light guides carrying the reference 126 in FIG. 7 is common to two elementary switches 122, whilst the light guides carrying the reference 128 are respectively connected to not shown optical fibres, the control means (for the application of the necessary voltages) also not being shown.

I claim:

1. An optical switch having at least one elementary optical switch formed on a support (8, 46, 70, 123), said elementary optical switch comprising a first array of N input-output light guides (24, 26, 74, 76, 78), N being an integer at least equal to 2, a second array of M input-output light guides (28, 80), M being an integer at least equal to 1, a rotary part (10, 72, 124) rotatable with respect to the support (8, 46, 70, 123) and which carries intermediate light guides (30, 32, 82, 84, 86), the center of gravity of the rotary part provided with the intermediate light guides being on the rotation axis (Z) of said rotary part, which is able to occupy, by rotation, positions in each of which one of the intermediate light guides connects one of the N input-output light guides to one of the M input-output light guides and means (12, 14, 16, 18, 20, 22, 94, 96, 98, 102) for rotating the rotary part, able to make the latter occupy any random one of the positions, characterized in that the support comprises a first substrate (8, 70, 123) and a second substrate (46) in planar form, which are superimposed and which are fixed to one another, the first substrate comprising at least one rotary portion, the second substrate comprising at least one rotary portion, said two rotary portions being superimposed and fixed to one another so as to form the rotary part (10, 72, 124) and one of the two substrates (8, 70, 123, 46) and the corresponding rotary portion respectively carry the input-output light guides and the intermediate light guides.

2. The switch according to claim 1, characterized in that the number N is equal to 2, the number M is equal to 1, the number of intermediate light guides (30, 32) is equal to 2, so that the number of positions is equal to 2 and the rotating means of the rotary part comprise a first group of two fixed, spaced electrodes (16, 18), a second group of two fixed, spaced electrodes (20, 22) and which are respectively opposite to the two electrodes of the first group with respect to the rotary part (10), two mobile electrodes (12, 14) rigidly integral with the rotary part and electrically interconnected and respectively placed between the two electrodes of the first group and between the two electrodes of the second group, so that they apply a voltage between two opposite electrodes respectively belonging to the first and second groups and it is possible to pass the rotary part from a position in which the mobile electrodes are in contact with the two other opposite electrodes to the other position.

3. The switch according to claim 1, characterized in that the number M is equal to 1, the number of intermediate light guides (82, 84, 86) is equal to N, so that the number of positions is equal to N, the rotary part (72) comprising on its periphery N slots (88, 90, 92) and rotation means comprising teeth (102) respectively associated with the slots and able to engage therein and actuating means (94, 96, 98) respectively associated with the teeth, each actuating means engaging the corresponding tooth (102) in the corresponding slot, thus bringing the rotary part (72) to one of its positions and for disengaging said tooth from said slot.

4. The switch according to claim 3, characterized in that each actuating means (94, 96, 98) comprises a lever (100) at one end of which is fitted the corresponding tooth (102) and an elongated, deformable electrode (104) fixed at its two ends and able to move, accompanied by deformation, the other end of the lever (100), thus causing the engagement of the corresponding tooth in the corresponding slot and the rotation means also means for creating a magnetic field (B) perpendicular to the elongated electrodes (104), so that by applying a voltage between the ends of one of the elongated electrodes, the latter undergoes a deformation.

5. A process for the production of the optical switch according to claim 1, characterized in that it comprises the following stages: production of N input-output light guides (24, 26, 74, 76, 78), M input-output light guides (28, 80) and intermediate light guides (30, 32, 82, 84, 86) on one of the faces of a first semiconductor substrate (8, 46), said face being called the front face of the first substrate; formation of a recess (44, 112) in said first substrate from the other face thereof and called the rear face of the first substrate, said recess defining a first portion of the rotary part (10, 72), the intermediate light guides being located on said first portion; formation of a toroidal recess (58) in a second semiconductor substrate (46), from one face thereof called the rear face of the second substrate, said toroidal recess defining a second portion of the rotary part; and fixing the other face of the second substrate, called the front face of the second substrate, to the rear face of the first substrate, so as to fix the first portion of the rotary part to its second portion and release of the rotary part (10, 72) from the remainder of the first and second substrates.

6. The process according to claim 5, characterized in that the substrates (8, 46) are made from silicon and are fixed to one another by means of a silicon-fusible glass.

7. The process according to claim 5, characterized in that the substrates (8, 46) are of silicon, in the second substrate (46) is formed from the upper face thereof a buried silicon dioxide layer (48) in the form of a ring, whose axis (Y) corresponds to the rotation axis of the rotary part (10), circular etching takes place around said axis from the upper face of the second substrate and up to said buried layer and, after fixing the substrates (8, 46) to one another, said buried layer (48) is eliminated across the toroidal recess (58), the latter being formed in the second substrate (46) up to said buried layer, which frees the corresponding portion of the rotary part.

* * * * *

UNITED STATES PATENT AND TRADEMARK OFFICE
CERTIFICATE OF CORRECTION

PATENT NO. : 5,278,692
DATED : January 11, 1994
INVENTOR(S) : Gilles Delapierre

It is certified that error appears in the above-identified patent and that said Letters Patent is hereby corrected as shown below:

Column 1, line 19, before "equal" insert --at least--.

Column 2, line 22, delete "matter" and insert --latter--;
line 48, delete "pas" and insert --pass--; and
line 49, before "two" insert --the--.

Column 5, line 55, delete "substrates" and insert --substrate--; and
line 68, delete "in" (second occurrence) and insert --is--.

Column 6, line 14, delete "bured" and insert --buried--.

Column 8, line 34, delete "tot he" and insert --to the--.

Signed and Sealed this

Thirtieth Day of August, 1994

Attest:

BRUCE LEHMAN

*Attesting Officer*  *Commissioner of Patents and Trademarks*